United States Patent [19]

Rodgers

[11] 4,305,508
[45] Dec. 15, 1981

[54] EQUIPMENT-CARRYING CRADLE

[75] Inventor: Kenneth G. Rodgers, Peterborough, England

[73] Assignee: Anglia Export Packing Ltd., Peterborough, England

[21] Appl. No.: 933,696

[22] Filed: Aug. 15, 1978

[30] Foreign Application Priority Data

Jun. 30, 1978 [GB] United Kingdom ............... 28454/78

[51] Int. Cl.³ .......................................... F16M 11/00
[52] U.S. Cl. .................................... 211/13; 108/55.3; 206/319; 206/600; 248/346; 248/671; 248/678
[58] Field of Search ................... 211/13; 206/319, 600; 108/52.1, 55.3, 56.1, 55.1; 248/346, 119 R

[56] References Cited

U.S. PATENT DOCUMENTS

| 2,432,295 | 12/1947 | Donahue | 108/52.1 |
| 2,555,529 | 6/1951 | Batts | 211/13 X |
| 3,469,542 | 9/1969 | Ahlenius | 108/56.1 |
| 3,472,363 | 10/1969 | Rustin et al. | 108/55.3 X |
| 3,478,869 | 11/1969 | Walters | 206/319 |
| 3,654,877 | 4/1972 | Barrett | 108/56.1 |
| 3,929,272 | 12/1975 | Bowles | 206/319 X |

FOREIGN PATENT DOCUMENTS

| 232510 | 2/1961 | Australia | 108/56 |
| 2452493 | 5/1976 | Fed. Rep. of Germany | 206/319 |
| 1418284 | 10/1965 | France | 206/600 |
| 427212 | 4/1935 | United Kingdom . | |
| 586905 | 4/1947 | United Kingdom | 206/319 |
| 680564 | 10/1952 | United Kingdom | 248/119 R |

Primary Examiner—Roy D. Frazier
Assistant Examiner—Robert W. Gibson, Jr.
Attorney, Agent, or Firm—Lawrence Rosen

[57] ABSTRACT

A cradle for carrying an internal combustion engine or other equipment has at least two longitudinal connection members and at least two transversely extending bearers. Each of the bearers is made of a high-density high-strength compressible cushioning material such as multi-wall board. Each bearer has a pair of generally upwardly-extending edges which support, and in part define a space to receive, the engine or like equipment. Multiple cradles of this design are also included within the invention.

16 Claims, 15 Drawing Figures

EQUIPMENT-CARRYING CRADLE

FIELD OF THE INVENTION

This invention relates to a cradle for supporting an engine such as an internal combustion engine, or for supporting like equipment.

PRIOR ART AND OBJECT OF THE INVENTION

Engines are packaged for transport and export, and in the past it has been necessary to build a particular design of cradle for each size and type of engine. Such cradles were often of wood and sometimes of metal. Examples are illustrated in the drawings accompanying this Specification. The multiplicity of sizes and types of engines and like equipment made by manufacturers has given rise to the need for a large number of different designs and sizes of cradle. It has therefore been necessary for firms in the business of mechanical equipment and engine packaging to carry a large stock of each of a large number of types of cradle. This means that expensive storage space is taken up storing cradles and an undesirably large amount of capital is tied up in the cradles. It would meet a need in the industry if a multi-purpose cradle was available.

SUMMARY OF THE INVENTION

According to the present invention, there is provided a cradle including at least two generally parallel laterally-extending bearers and at least two longitudinally extending connection members, in which each of the bearers is made of a high-density high-strength compressible cushioning material and has two generally upwardly-extending edges which in part define a space within which the equipment to be carried in the cradle is accommodated, each of the edges making an angle in the range 90 to 120 degrees to the horizontal in the normal horizontal position of the cradle.

In this Specification, by high density high strength compressible cushioning material is meant a material such as multi-wall board (compressed normal to its edge) or high density polystyrene which compresses to a limited extent under an applied load, and the performance characteristic of compression versus applied load is substantially equivalent to that of multi-wall board compressed normal to its edge.

The material of the bearers is preferably multi-wall board as herein defined.

In this Specification the phrase multi-wall board is used to mean a laminate of corrugated paper and heavy paper or cardboard consisting of at least 3 layers of the latter sandwiching at least two layers of corrugated paper, the layers being secured together by adhesive. A laminate including 4 layers of heavy paper or cardboard and 3 layers of corrugated paper would be equally suitable. One example of a suitable multi-wall board is that known as TRI-WALL marketed by Tri-Wall Containers Limited of London, W1Y 5AA.

A preferred range of angles for the edges to make with the horizontal is the range 100 to 120 degrees.

Each bearer may be made of at least four multi-wall boards adhesively laminated together. Each bearer may be reinforced by one or more additional multi-wall boards laminated to either or both faces thereof.

The connection members may also be made of laminated multi-wall board.

The bearers may be generally rectangular in shape modified in that each has a cut-out to receive a connection member on each side, and an engine-receiving cut-out in part defined by the said edges. Each such edge may define one side of an upstanding post forming a part of the bearer. An outer edge of one of the posts is preferably inclined to the vertical in the normal position of the cradle.

The invention also provides cradles constructed according to the foregoing principles and capable of receiving and carrying two, or three, or four, or any reasonable number of engines.

By the provision of bearers of multi-wall board, and by the location of edges thereof at a specified range of angles to the horizontal, it is possible to accommodate a wide variety of engine sizes and types in a single cradle. The parts of the inclined edges upon which the engine bears are compressed in use by the weight of the engine which consequently sinks into a relatively secure and stable position on the cradle. It may be secured thereto by strapping or by shrink-wrapping or in any other convenient way. By the use of multi-wall board, the likelihood of damage to the engine is reduced.

In this Specification, while reference is frequently made to an engine being carried by the cradle, it will be understood that the cradles according to the invention could equally well be useful in carrying other equipment.

BRIEF DESCRIPTION OF THE DRAWINGS

The invention will be better understood from the following particular description given with reference to the accompanying drawings, in which.

PARTICULAR DESCRIPTION OF PRIOR ART

Figure 1:
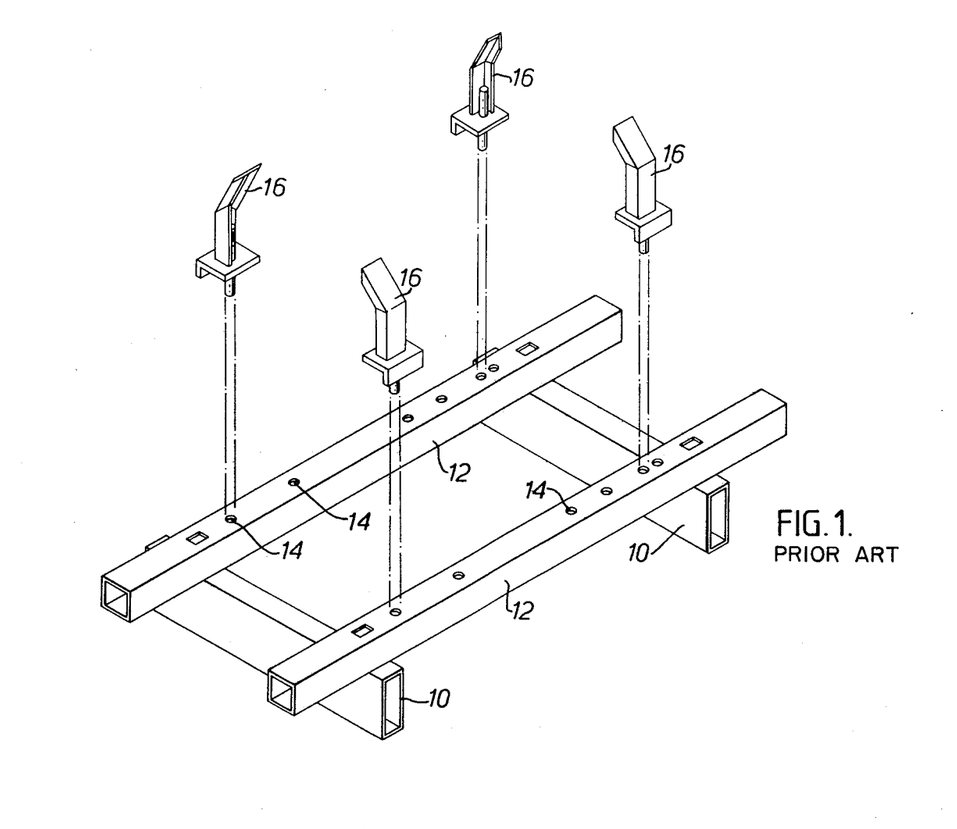
FIG. 1 is an exploded perspective view of one form of metal engine cradle according to the prior art.

The prior art engine cradle shown in FIG. 1 has metal (usually steel) cross-support 10 which are welded or bolted to metal longitudinal supports 12. These have a number of holes 14 into which fit support posts 16. Although they are not shown in FIG. 1, each post usually has a plastics cap thereon to prevent damage to the paint or structure of the engine being carried. It will be realised that for different sizes and shapes of engine, posts 16 of different size and shape will be needed. Also, the positioning of the holes 14 may not be ideal from viewpoint of providing balanced support. The centre of gravity of the resulting package is high.

Figure 2:
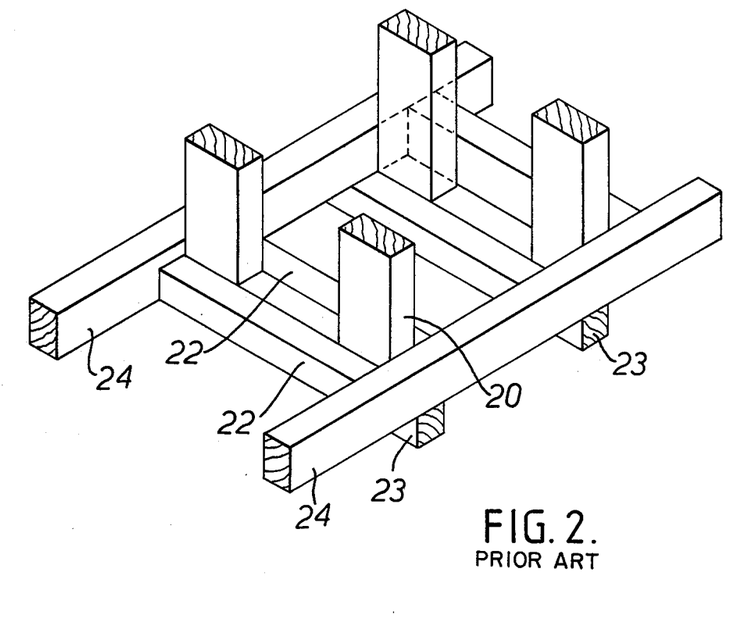
FIGS. 2 and 3 are perspective views of forms of wooden engine cradle according to the prior art.
Figures 4, 5:
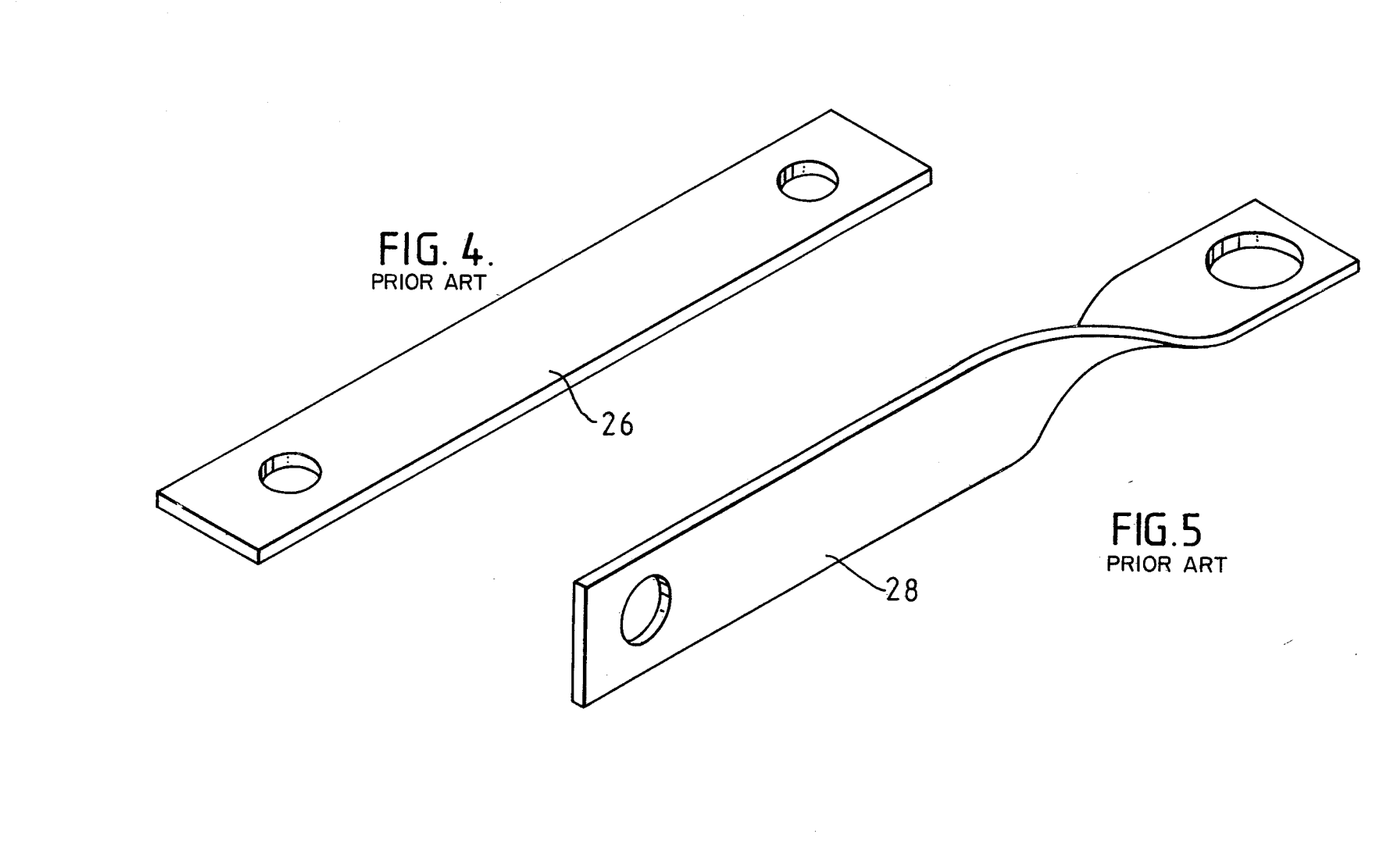
FIGS. 4 and 5 show typical items of metal hardware which it is necessary to keep in stock to use with various engine cradles according to the prior art.

The prior art wooden engine cradle shown in FIG. 2 is made from timber and includes four upstanding posts 20 whose lower ends are located between cross members 22 and above cross members 23 and are adjacent to longitudinal runners 24. The timber members are secured together by nailing or bolting. Straps such as the straps 26 and 28 shown in FIGS. 4 and 5, and coach screws or nuts and bolts, may be used to fix the engine to the cradle.

Figure 3:
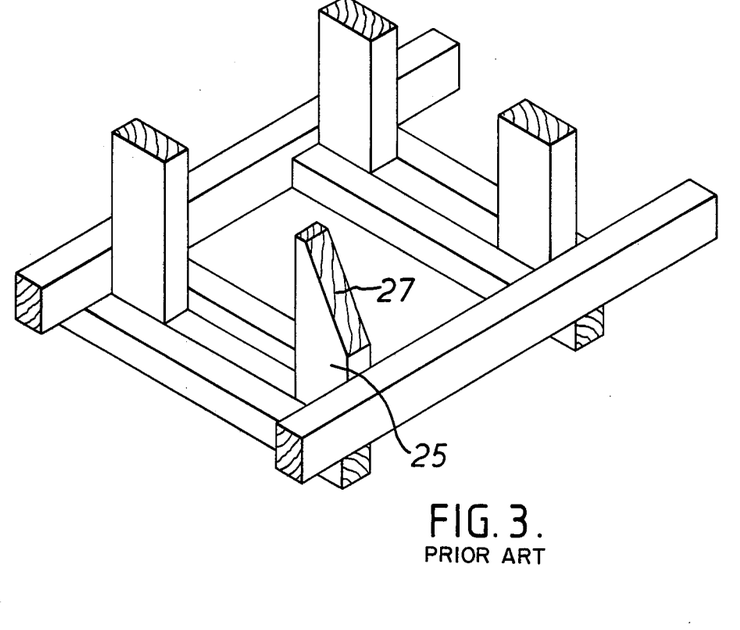

FIG. 3 shows another example of a timber cradle. It is generally similar to the cradle shown in FIG. 2 except that one of the vertical posts 25 has its outer corner chamfered off to provide an inclined surface 27. This is done to avoid that particular post fouling a part of a particular engine when that type of engine is placed on the cradle. It will be realised that engines of different size and shape will require different cradles to be constructed to accommodate them, and different hardware to secure them to such cradles. The increasing cost of timber and the high cost of semi-skilled and skilled labour means that it is less attractive to the businessman to construct and store a large number of different timber cradles.

DESCRIPTION OF EMBODIMENTS OF THE INVENTION

Figure 6:
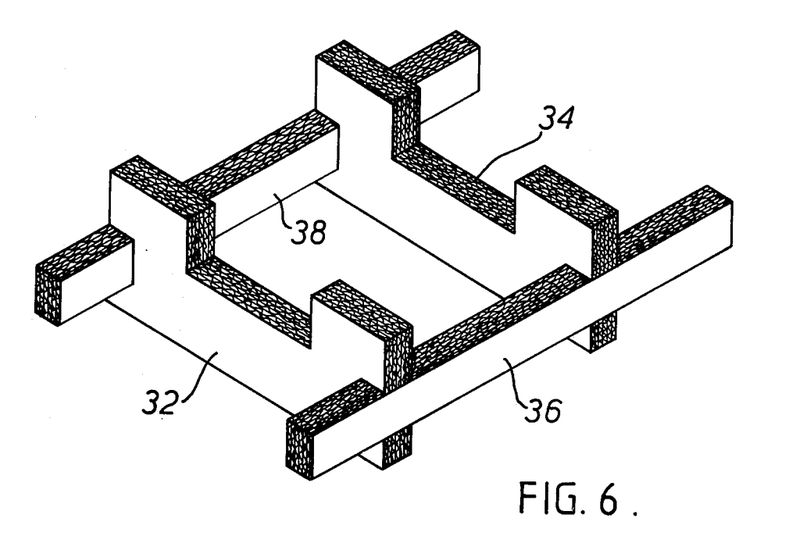
FIG. 6 is a perspective view of one example of engine cradle according to the present invention.

An example of a cradle according to the invention is shown in FIG. 6. The illustrated cradle has two generally parallel cross bearers 32, 34 each made of a plurality of multi-wall boards laminated together and all located with their major planes substantially vertical. As shown, six multi-wall boards are laminated together, but fewer or more boards could be used for each bearer. The two bearers 32, 34 each have a pair of recesses cut out from their vertical sides, to receive longitudinal connection members 36 and 38. These are also preferably of multi-wall board, but need not necessarily be of this material as members 36 and 38 of wood or metal could be used if desired. An advantage of using members 36 and 38 of multi-wall board is that the edge-to-edge contact between the layers of the bearer 32 and those of the member 36 gives a high friction engagement, and if the recess is made so that the member 36 is a tight push fit therein, then no other securing means is needed. The same is true at the joints at the other three corners. It will be realised that this method of connection gives rise to a very simple manner of assembly of an engine cradle, and the spacing between the transverse bearers 32 and 34 can be adjusted as desired. Consequently one design of cradle is able to accept engines of different lengths and the quantity of ancillary parts that must be kept in store (and classified) is reduced to zero. The arrangement of each piece of multi-wall board with the plane of its laminations vertical (in the normal position of use of the cradle) gives good strength properties, bearing in mind that the load applied to the cradle is usually applied in a vertically downward direction.

Figure 7:
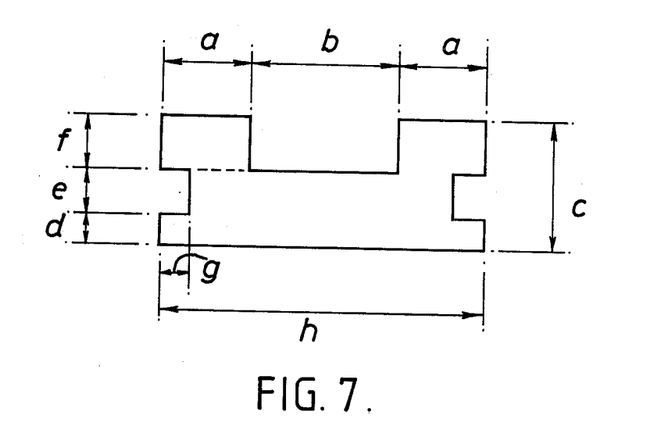
FIG. 7 is an end view of a bearer used in the cradle shown in FIG. 6.

FIG. 7 is an end view of one of the bearers 32 and typical dimensions are given by way of example. The invention is however not regarded as limited to these particular dimensions.

| | |
|---|---|
| a = | approximately 150 millimeters |
| b = | approximately 250 millimeters |
| c = | approximately 219 millimeters |
| d = | approximately 50 millimeters |
| e = | approximately 75 millimeters |
| f = | approximately 94 millimeters |
| g = | approximately 50 millimeters |
| h = | approximately 550 millimeters |

Each multi-wall board can be a double-wall board or a triple-wall board or a quadruple-wall board, or other type of board as desired. However, in laminating a bearer for use in the present invention it will usually be preferable to use say 4 or 5 triple-wall boards, or 6 to 8 double-wall boards, or an equivalent number of other types of multi-wall board laminated together. For avoidance of doubt, it should be explained that a double-wall board is a board having three substantially flat layers of heavy paper or thin cardboard between the first and second of which, and between the second and third of which is sandwiched a layer of corrugated paper, the assembly being adhesively secured together. Likewise a triple-wall board has 4 flat layers interleaved with 3 corrugated layers.

Figure 8:
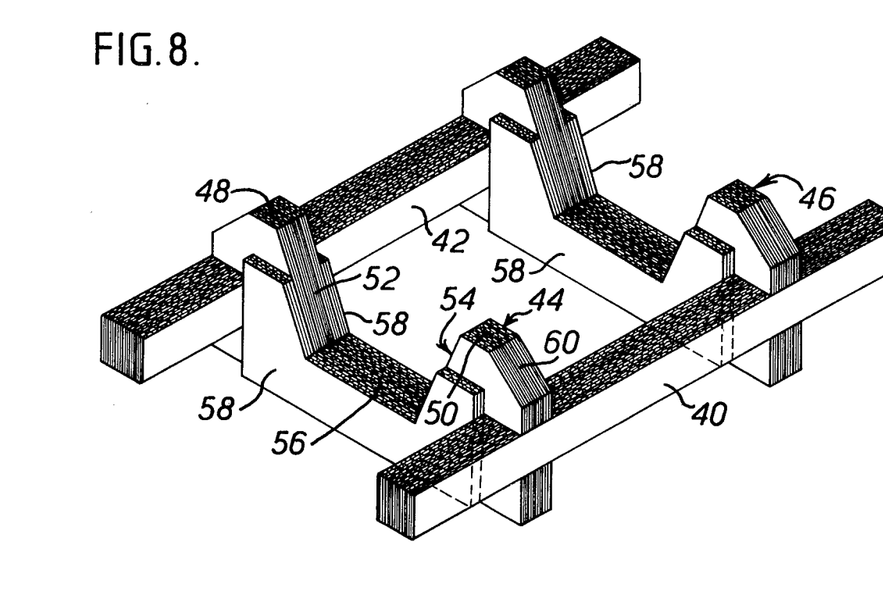
FIG. 8 is a perspective view of a presently-preferred example of engine cradle according to the invention, and FIG. 8A diagrammatically shows a bearer thereof carrying an engine.
Figure 8A:
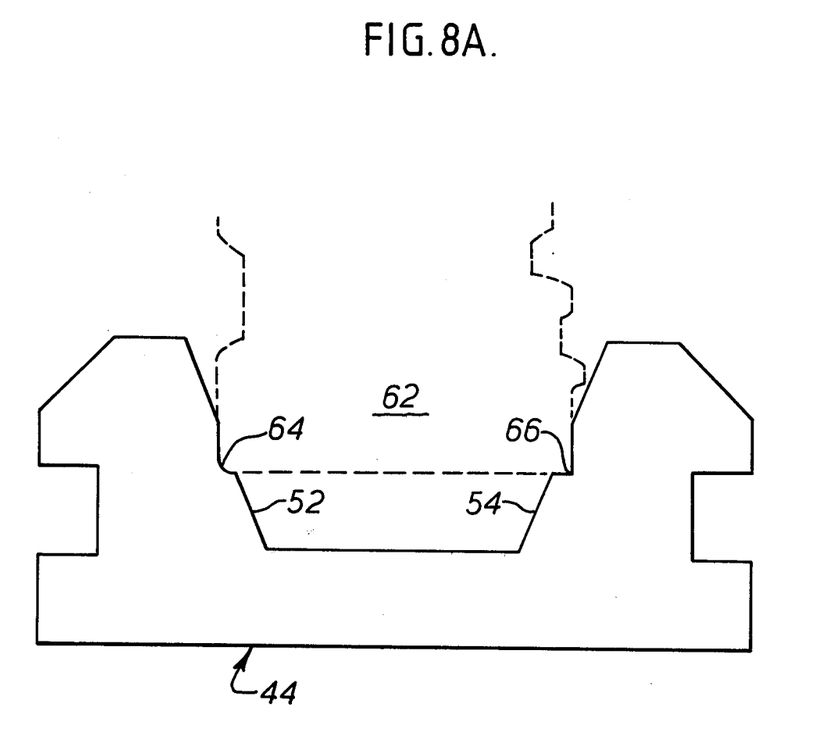

FIG. 8 illustrates a preferred version of the invention, in which a cradle for an engine has longitudinal connection members 40 and 42 extending between transverse bearers 44 and 46. All these parts are of multi-wall board. Each bearer is formed by upstanding posts 48 and 50 having edges 52 and 54 inclined to the vertical, and a cross-piece 56, on either side of which is secured a reinforcing multi-wall board 58. The outer top corner of each post is chamfered off to give an inclined surface 60. In use, the engine rests in the recesses defined by the top surface 56 and the inclined surfaces 52 and 54. Engines of different widths can be received in one single design of bearer, because the lower corners of the engine contact the edges 52 and 54 and the multi-wall board is compressed to a limited extent at the area of contact. This is illustrated in FIG. 8A which shows an engine 62 resting with its bottom edges 64 and 66 having compressed the adjacent regions of multi-wall board. This has been surprisingly found to give a secure and stable support when the engine is either strapped or shrink-wrapped to the cradle.

Figure 9:
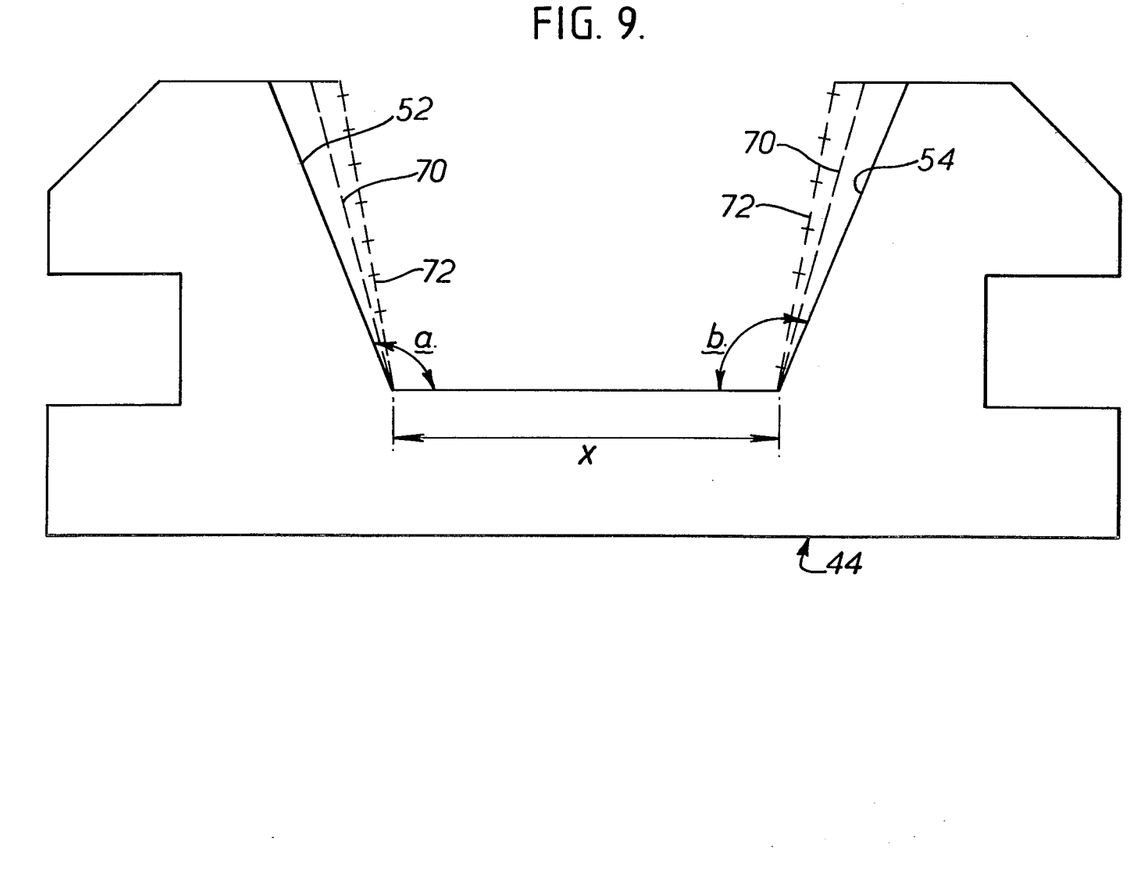
FIG. 9 is an end view of a bearer used in the cradle shown in FIG. 8.

The configuration of one example of bearer is seen from FIG. 9. The distance x may be from 178 to 252 millimeters, as this has been found useful to make the bearer compatible with a wide variety of present-day commercial engines, and the angles a and b are preferably equal and each may be in the range of 90 to 120 degrees. The preferred range is 100 to 113 degrees and an especially optimum range is 105 to 110 degrees. The lines 70 show the configuration with an angle of 105° and the lines 72 show it with an angle of 100 degrees. The bearer 56 as illustrated consists of 4 layers of triple-wall board and each reinforcing panel 58 consists of one triple-wall board. The panels 58 may be omitted in which case 5 or 6 layers of triple-wall board may be used for the bearer 56. As mentioned, high density polystyrene or material of like properties may equally well be used for the bearers instead of multi-wall board.

Figure 10:
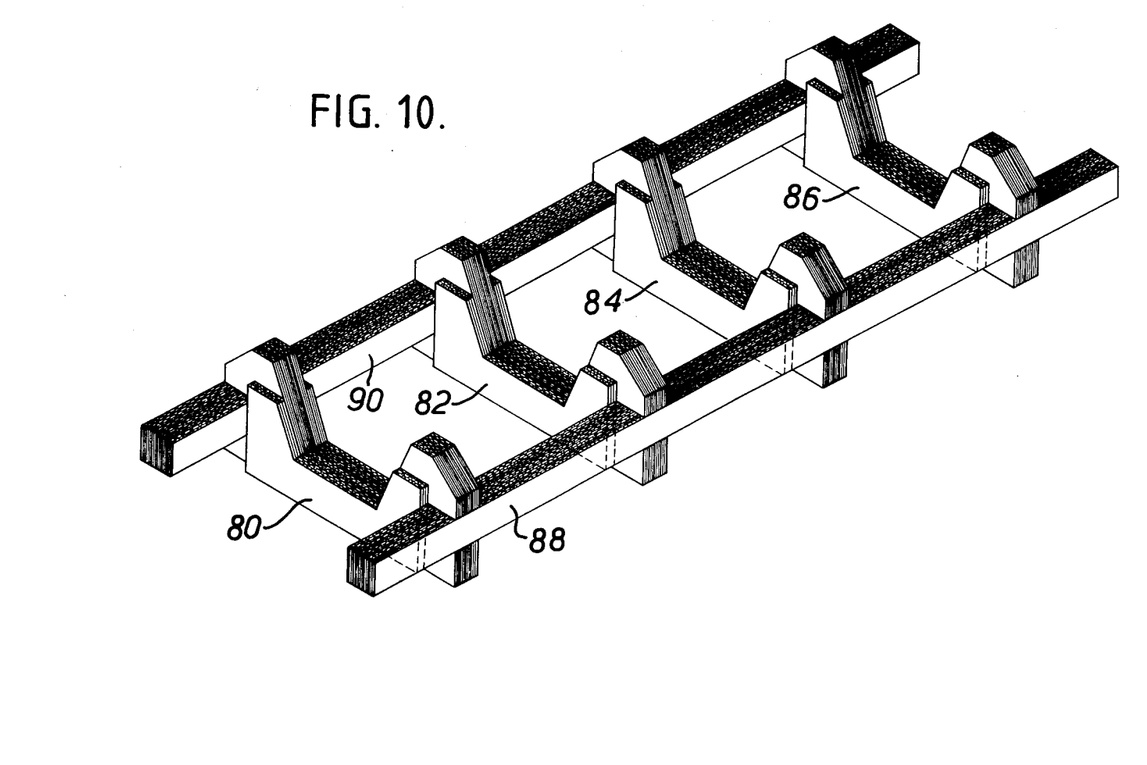
FIG. 10 is a perspective view of a cradle for two end-to-end engines, according to the invention.

FIG. 10 illustrates an engine cradle having four multi-wall board bearers 80, 82, 84, 86 and two multi-wall board longitudinal connection members 88 and 90. The connections therebetween are recess and push-fit connections as already described in detail. This cradle is for two engines arranged end-to-end and both, and the cradle, may be covered with a single shrink wrapping.

Figure 11:
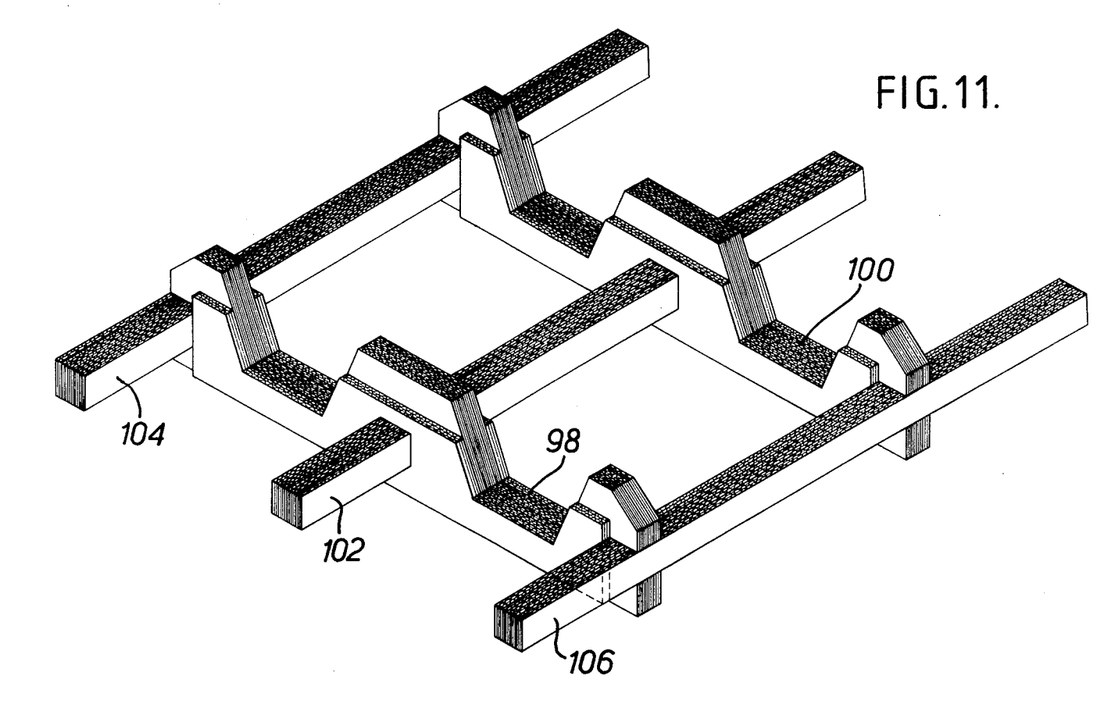
FIG. 11 is a perspective view of a cradle for two side-by-side engines, according to the invention.

FIG. 11 illustrates an engine cradle in which two multi-wall board bearers 98, 100 each have a square hole centrally therein through which extends a longitudinal connection member 102. Outer longitudinal connection members 104 and 106 are also provided. All the parts 98-106 are of multi-wall board. This cradle takes two side-by-side engines.

Figure 12:
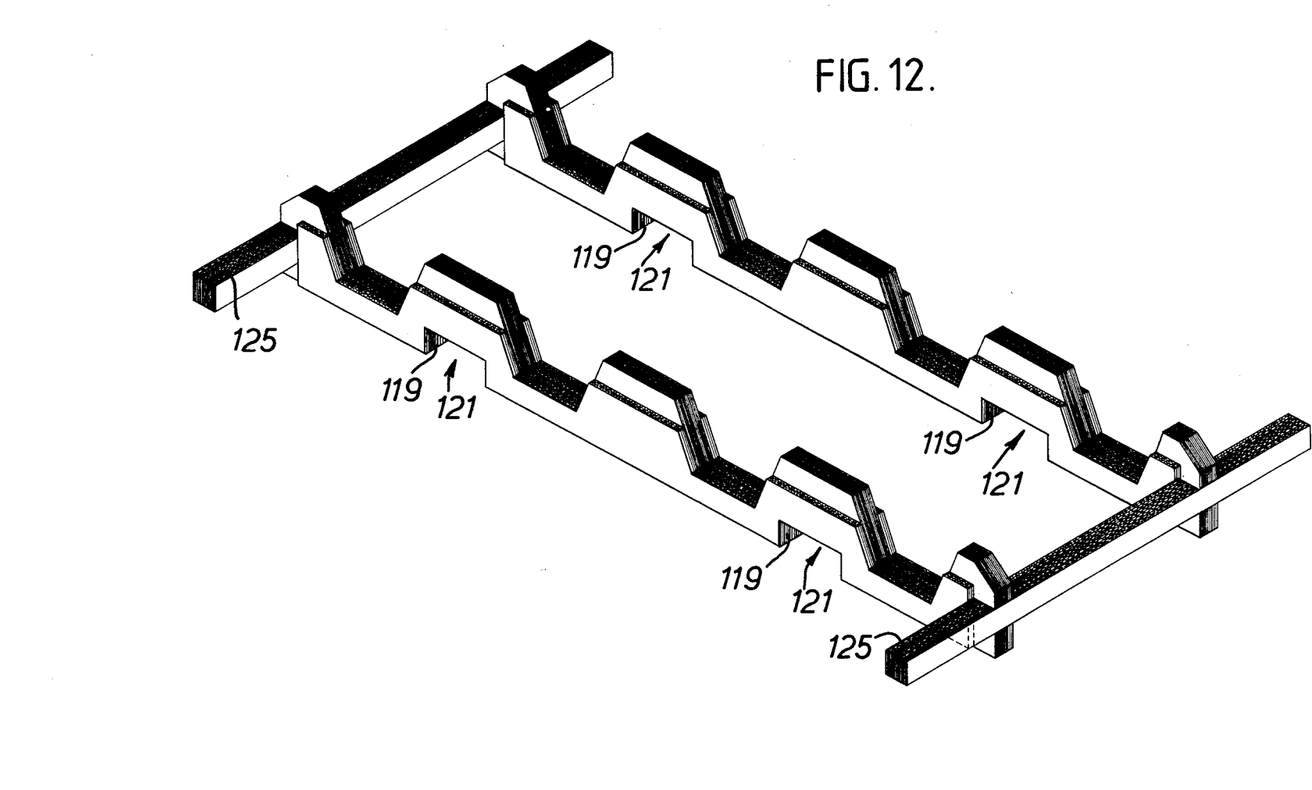
FIG. 12 is a perspective view of a cradle for four side-by-side engines, according to the invention.

FIG. 12 is another example of a cradle suitable for four side-by-side engines. The principles of design are the same as previously described.

Figure 13:
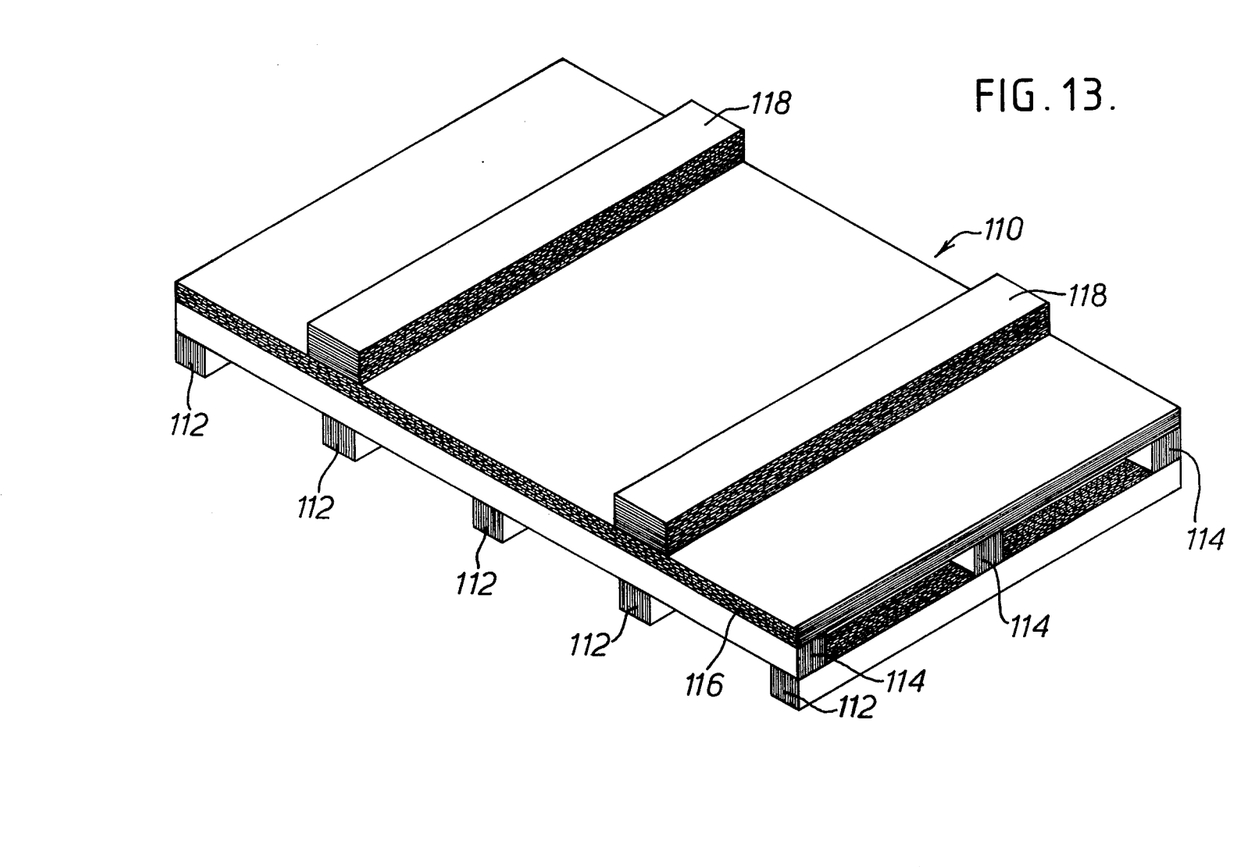
FIG. 13 is a perspective view of a pallet made from multi-wall board which could be used with a cradle according to FIG. 12.

FIG. 13 shows a pallet base suitable for use with the FIG. 12 cradle, the base 110 also being made of multi-wall board and consisting of 5 longitudinal beams 112, three transverse beams 114, a sheet 116 and two longitudinal supports 118 which engage in the recesses 121 shown in FIG. 12 when the cradle and pallet are assembled together. The principal plane of the multi-wall board in parts 112 and 114 is vertical, whereas in parts 116 and 118 it is horizontal. Alternatively, instead of making all the pallet base 110 of multi-wall board it may be preferable for reasons of strength to make the parts 112, 114 of wood or metal, the part of plywood, and the supports 118 of multi-wall board. In this way one can enjoy the strength properties of the parts 112 and 114 and the high friction edge-to-edge engagement between the generally vertical sides of the supports 118 and the generally vertical exposed edges 119 which partly bound the cut-outs 121 in the bearers seen in FIG. 12. The longitudinal connection members 125 seen in FIG. 12 are shown as multi-wall board but (a) could be omitted or (b) could have inner and/or outer facings of plywood or metal to improve their strength and resistance to bending loads in a generally vertical plane. The feature of length adjustability of the cradle is in either case still retained.

Figure 14:
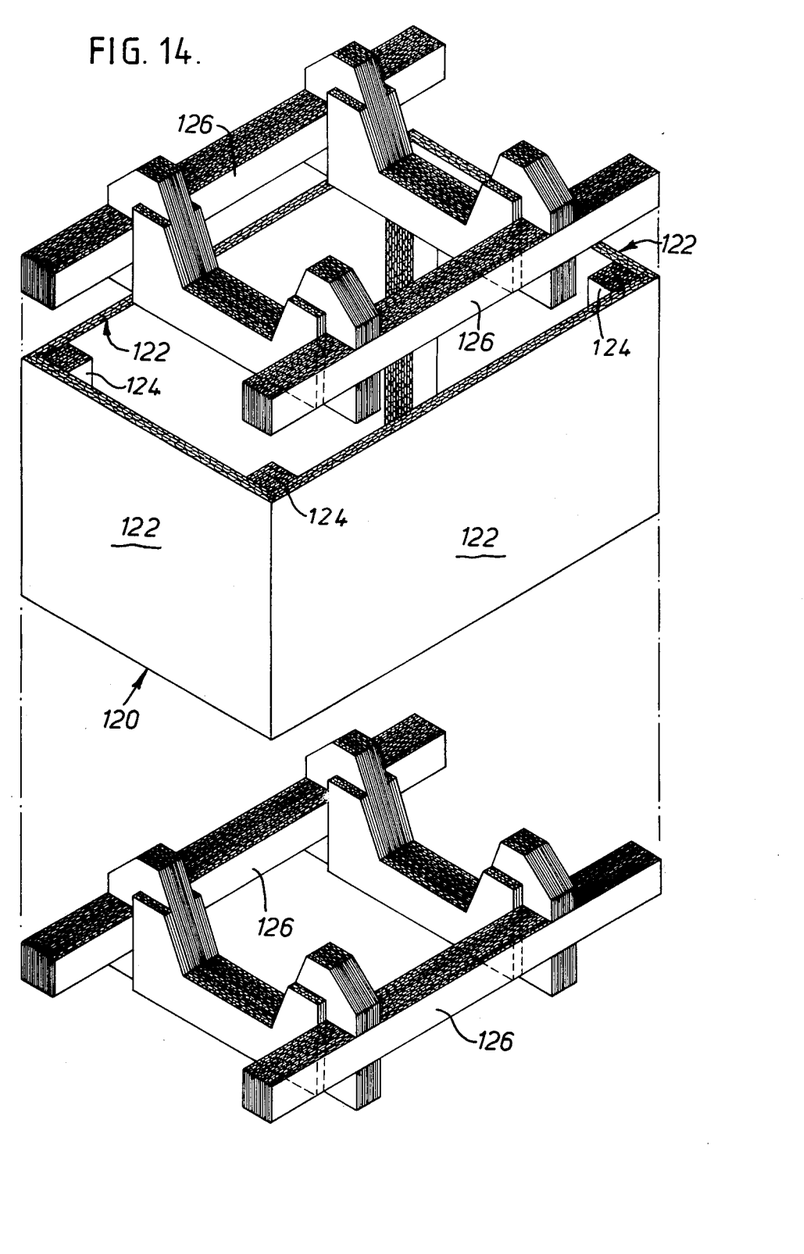
FIG. 14 is an exploded view of a twin-unit module, that is to say, an assembly including two cradles in accordance with the engine and a hollow box-like spacing support also made from multi-wall board.

FIG. 14 illustrates how two cradles of the kind illustrated in FIG. 8 can be combined, using a hollow box-like spacing support 120 made wholly of multi-wall board, into a twin-unit module. The box-like support 120 has four vertical panels 122 and posts 124 each at or adjacent to a corner of the support 120. The panels 122 and posts 124 may be adhesively secured together, and the dimensions of the support 120 are chosen so that its outside length equals that of the longitudinal connection members 126 and its outside breadth equals the distance between the outside faces of the members 126.

Figure 15:
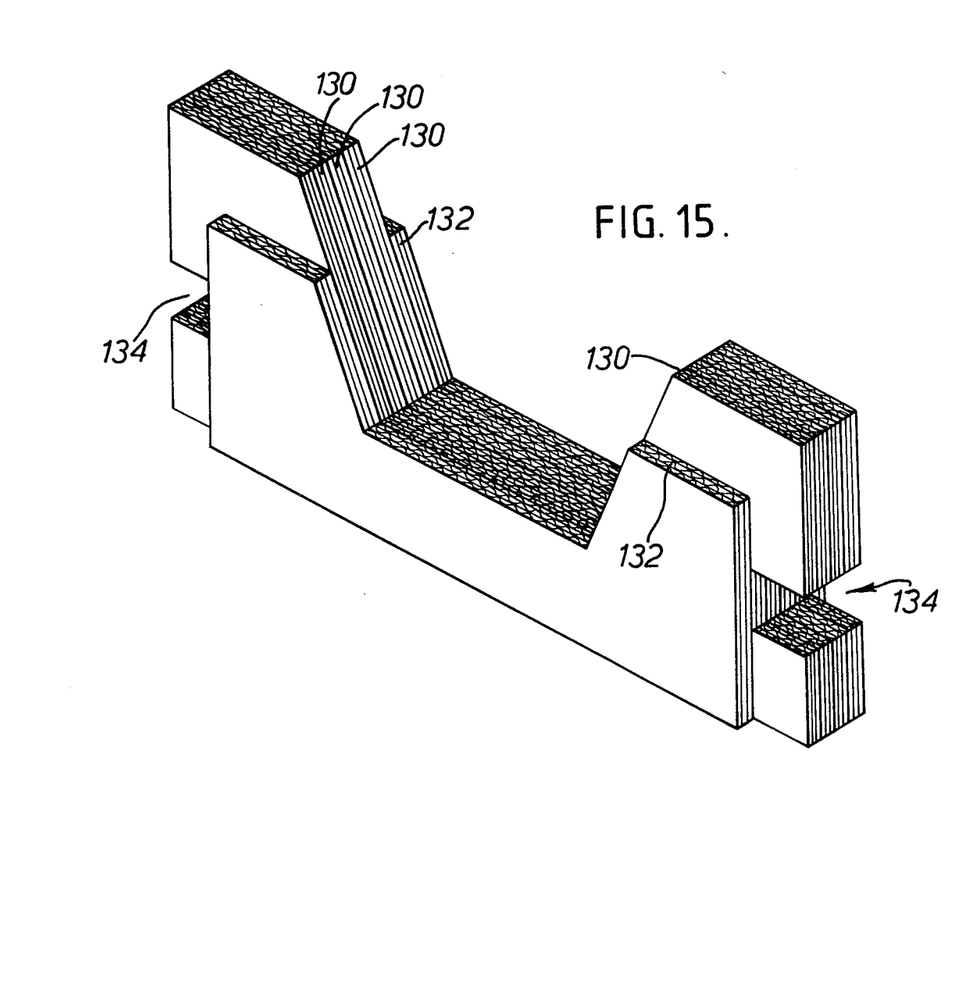
FIG. 15 shows one example of a bearer for use in the FIG. 11 example of the invention.

FIG. 15 is a perspective view of one form of bearer which can be included in a cradle according to the invention. It is made up of 4 layers 130 of multi-wall board combined with two reinforcing layers 132 of multi-wall board. Each such multi-wall board layer 130 or 132 has three layers of corrugated paper respectively sandwiched between layers of thin cardboard or thick paper. Recesses 134 are cut out to receive longitudinal connection members. Alternatively, the bearer may be made up of 6 or 8 multi-wall boards, all laminated together, and then have the engine-receiving and connection-member-receiving recesses cut out therefrom. If preferred the recesses may be cut from the individual boards and the boards then laminated.

The invention as specifically described and illustrated herein is believed to be a new and useful design of cradle which is widely applicable and allows the user to dispense with large stocks of different conventional cradles. The carrying length can be adjusted easily and engines of different base width form their own stable nesting position (FIG. 8A). The cradle can be easily made from relatively inexpensive material without the need for highly skilled craftsmen. The cut-out for the engine or other equipment being carried can be off-set from centre if required. The adjustable cradle is a cushion pack in its own right and is designed to be used preferably in conjunction with polythene shrink wrap cover, requiring no other type of fixing. The cradle has a weight advantage over (i.e. is lighter than) metal or timber equivalents for loads of corresponding size. Cradles for more than one engine can readily be made. Safety of the product in transit is enhanced by the use of this cradle, all parts of which may have a cushioning action. By the use of the present cradle, a lower centre of gravity may be obtained in the resulting package, with consequential improved stability.

Instead of using multi-wall board for the bearers, one can use other high density high-strength cushioning materials such as polystyrene.

I claim:
1. A cradle comprising:
   (a) at least two transversely-extending bearers formed of laminated multi-wall board, said bearers being in spaced and generally parallel relationship;
   (b) at least two longitudinally extending connection members, one at each side of the cradle, each of the members being releasably connected to each of the bearers to allow relative longitudinal movement of the bearers;
   (c) each of the bearers having a pair of upstanding portions of exposed substantially planar straight edge surfaces which extend at an angle in the range 90 to 120 degrees to the horizontal considered in the horizontal position of the cradle, the two said edges of each bearer in part defining a recess for receiving an item of equipment to be carried by the cradle.

2. A cradle according to claim 1 in which each bearer is made of at least four multi-wall boards adhesively laminated together.

3. A cradle according to claim 2 in which each bearer is reinforced by an additional multi-wall board secured to at least one face thereof.

4. A cradle comprising:
   (a) at least two transversely-extending bearers formed of laminated multi-wall board, said bearers being in spaced and generally parallel relationship;
   (b) at least two longitudinally extending connection members, one at each side of the cradle, each of the members being releasably connected to each of the bearers to allow relative longitudinal movement of the bearers;
   (c) each of the bearers having a pair of upstanding portions each of which has an exposed substantially straight edge surface which extends at an angle in the range 90 to 120 degrees to the horizontal considered in the horizontal position of the cradle, the two said edges of each bearer in part defining a recess for receiving an item of equipment to be carried by the cradle;
   (d) and each of the bearers defining a lateral-opening recess at each side thereof which is a tight push fit with the respective connection member, whereby the longitudinal distance between adjacent bearers can be varied by disposing the respective bearers at selected positions along the length of the connection members.

5. A cradle comprising at least two generally parallel and laterally-extending bearers and at least two longitudinally extending connection members releasably connected thereto to allow relative longitudinal movement of the bearers, in which each of the bearers is made of laminated multi-wall board and has two generally upwardly-extending substantially straight edge surfaces which in part define a space within which the equipment to be carried in the cradle is accommodated, each of said surfaces being constituted by exposed edges of the board and making an angle in the range 90 to 120 degrees to the horizontal in the normal horizontal position of the cradle.

6. A cradle according to claim 5 in which the connection members are made of laminated multi-wall board.

7. A cradle according to claim 5 in which the bearers are generally rectangular in shape and are provided with a cut-out in the outer sidewalls thereof to receive a connection member on each side, an engine-receiving cut-out in part being defined by the said edges.

8. A cradle according to claim 5 in which each of the connection members is a tight push fit in a corresponding pair of recesses, one in each bearer, and said fit constitutes the sole means of securing the members to the bearers.

9. A cradle according to claim 5, wherein the material from which said bearers are formed is high density polystyrene.

10. A cradle according to claim 5 in combination with a pallet in which selected ones of said longitudinal connection members form part of the pallet.

11. A cradle for supporting an engine such as an internal combustion engine, the cradle comprising at least two generally parallel laterally extending engine-supporting bearers and at least two longitudinal connection members releasably connected thereto to allow relative longitudinal movement of the bearers, in which each of the bearers is made of a laminated multi-wall board and has two engine-supporting substantially straight and planar edges which makes an angle in the range 90 to 120 degrees to the horizontal in the normal horizontal position of the cradle.

12. A cradle according to claim 11 in which each edge defines one side of an upstanding post forming a part of the bearer.

13. A cradle according to claim 12 in which each edge makes an angle in the range 100 to 120 degrees with the horizontal in the normal horizontal orientation of the cradle, and the recess so defined tapers so that it becomes narrower towards its bottom.

14. A cradle according to claim 12 in which an outer edge of one of the posts is inclined to the vertical in the normal position of the cradle.

15. A cradle for supporting a plurality of engines which includes at least two bearers as defined in claim 11 and at least three longitudinal connection members.

16. A cradle for supporting a plurality of engines which includes at least two bearers each having at least two engine-receiving recesses in part defined by edges as specified in claim 11, and at least two connection members each extending between the bearers.

* * * * *